May 5, 1970  C. E. CLELAND ET AL  3,510,040
WORK INDEXING APPARATUS FOR CUTOFF SAWS
Filed Feb. 21, 1968  4 Sheets-Sheet 2
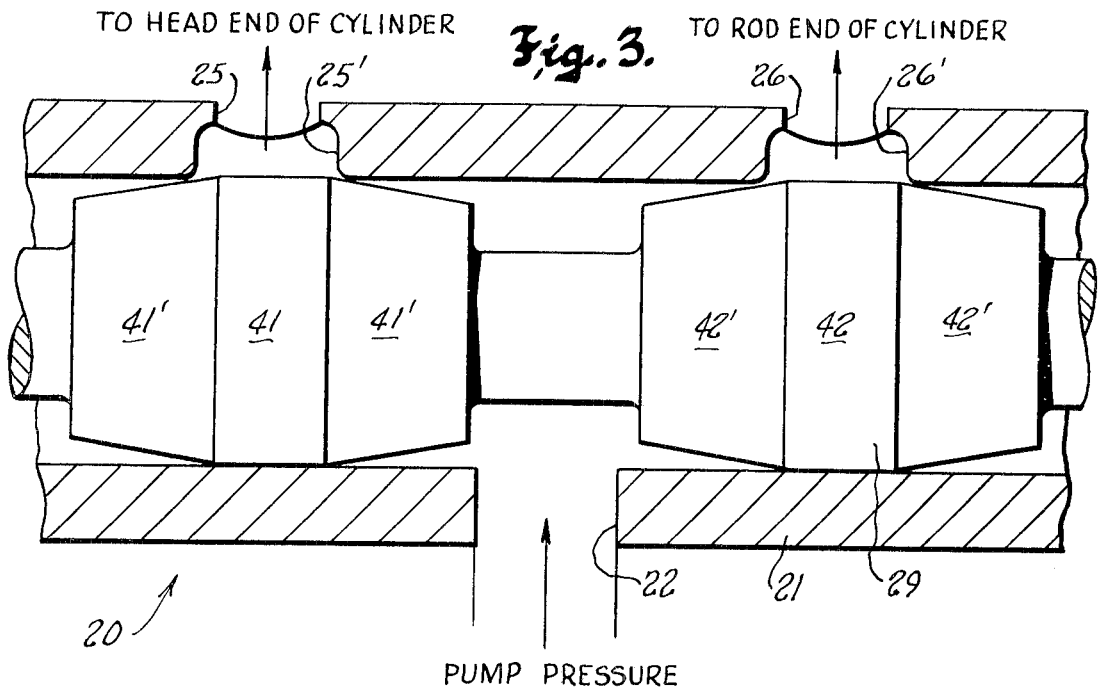
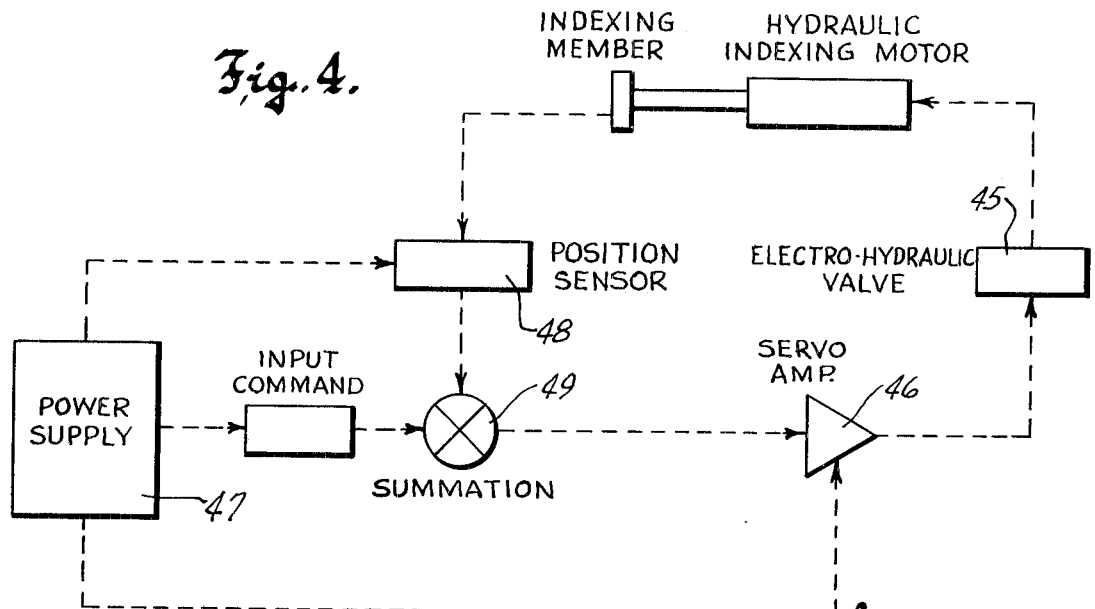

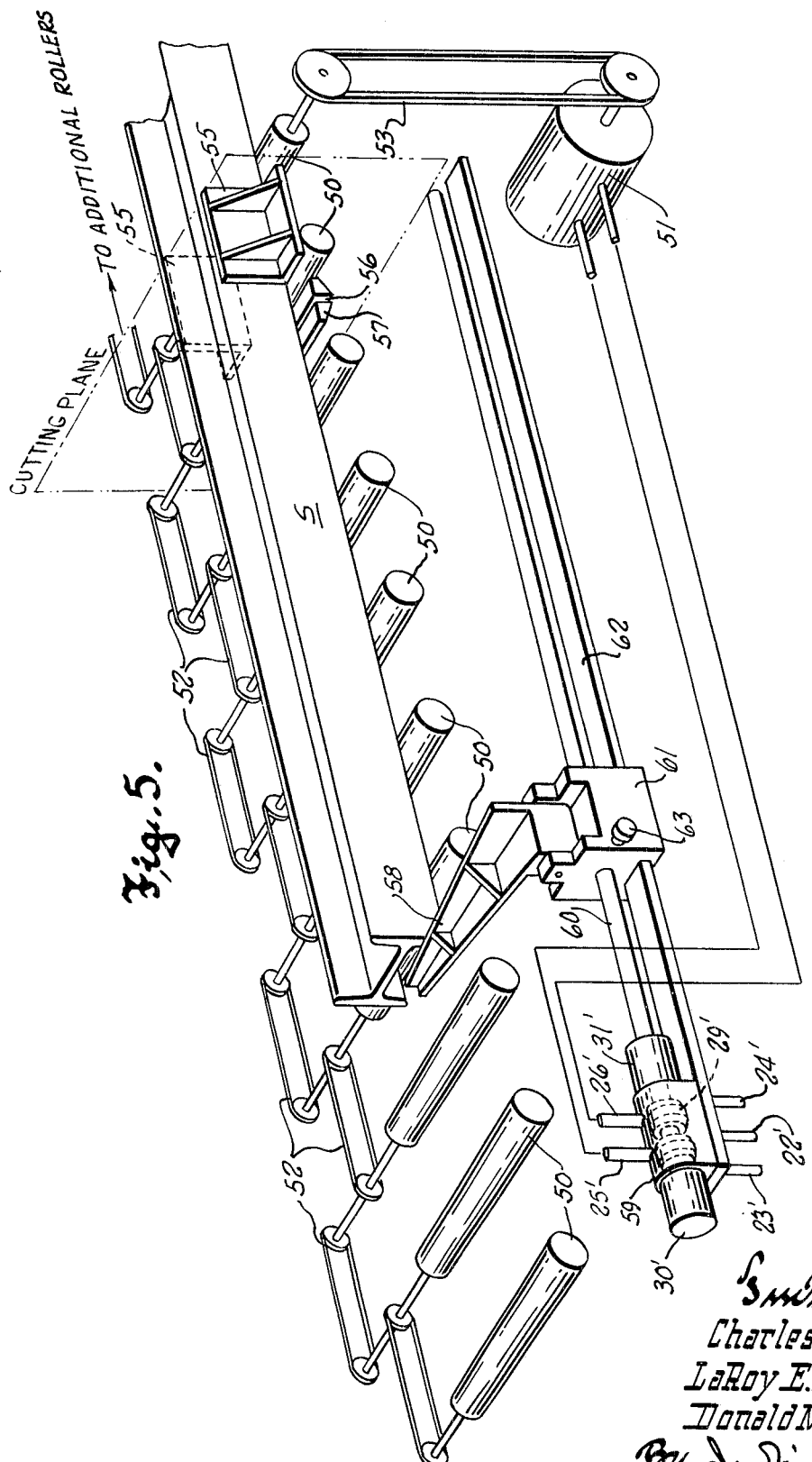

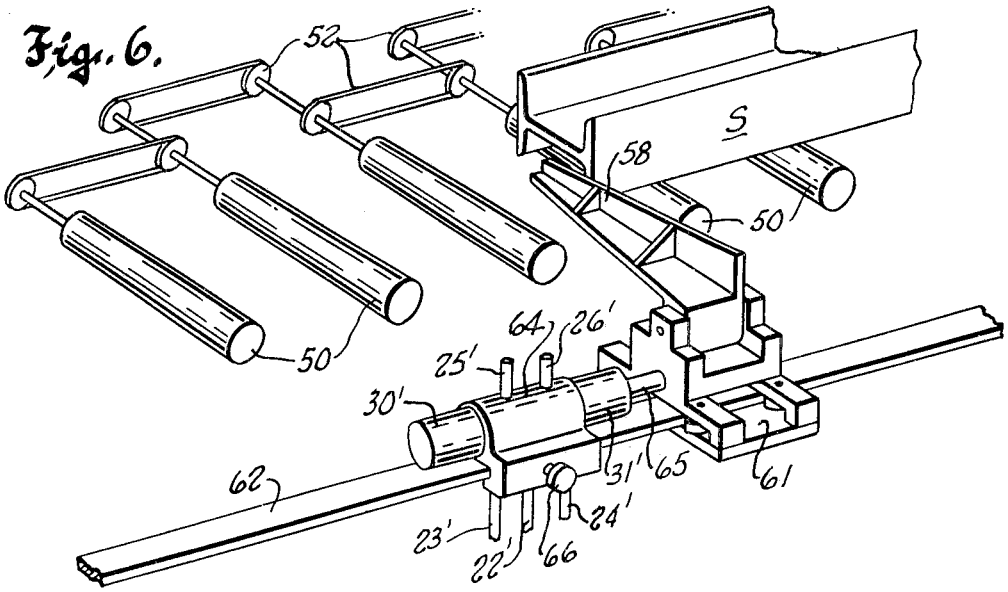
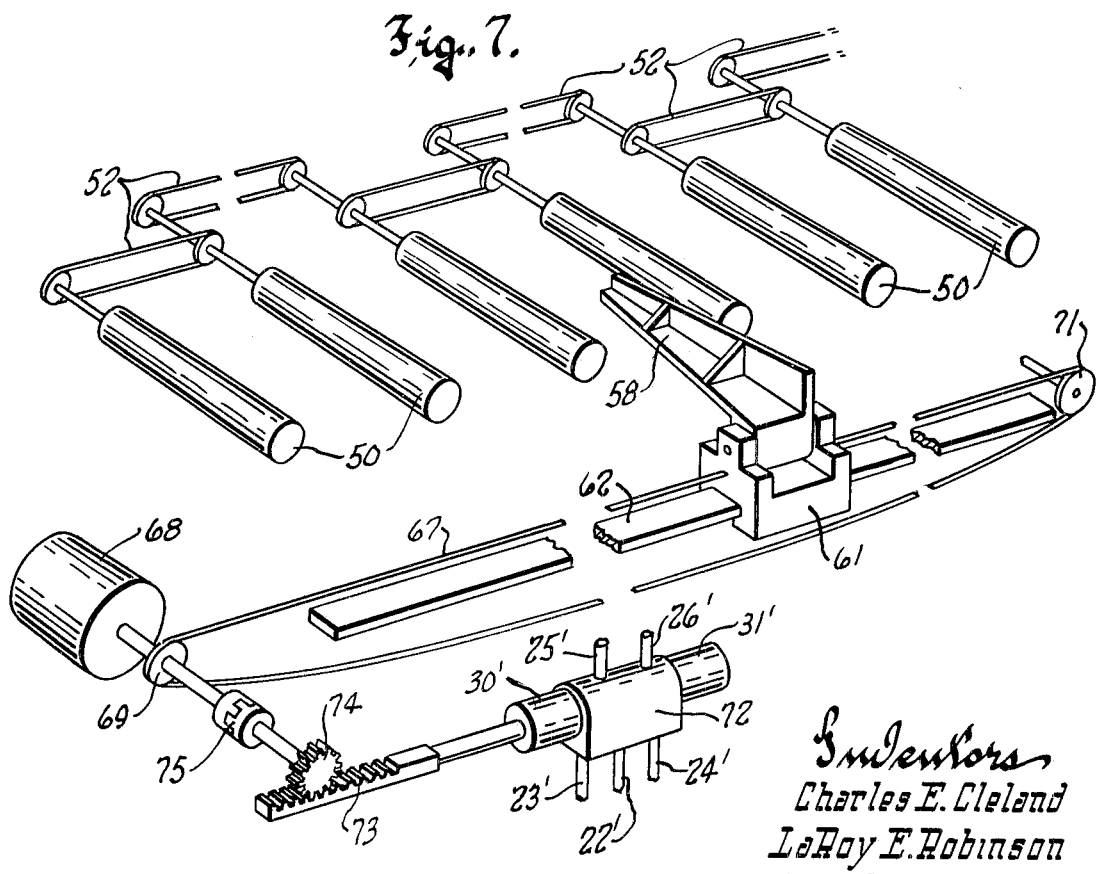

United States Patent Office 3,510,040
Patented May 5, 1970

3,510,040
WORK INDEXING APPARATUS FOR CUTOFF SAWS
Charles E. Cleland, Edina, La Roy E. Robinson, Hopkins, and Donald M. Ullevig, Minneapolis, Minn., assignors to Continental Machines, Inc., Savage, Minn., a corporation of Minnesota
Filed Feb. 21, 1968, Ser. No. 707,272
Int. Cl. B65h 17/36
U.S. Cl. 226—141
17 Claims

ABSTRACT OF THE DISCLOSURE

A workpiece is advanced and accurately positioned with respect to the cutting plane of a cutoff saw, either by a hydraulically driven reciprocating indexing vise or by hydraulically driven rollers on which the workpiece rests. In each instance, the spool of a control valve that regulates flow of pressure fluid to the hydraulic motor that produces the motion needed to move the workpiece, is brought to a position in which it effects equal and opposite fluid pressure forces upon the work performing element of the motor or motors, when the workpiece is at its desired location.

---

This invention relates to work indexing or feeding apparatus for cutoff saws. One embodiment of the invention deals with intermittent and repeated advance or indexing of a workpiece an exact distance, and the concerns itself particularly with the problem of accurately defining the stroke of the work indexing vise of automatic cutoff saws used to cut long lengths of bar stock into many pieces of the same predetermined length.

In such cutoff saws, the work or stock is gripped and held as it is being cut, by a vise located just behind the plane in which the saw operates. This vise is usually referred to as the front vise. At the completion of the cut the saw is moved out of the cutting zone, usually it is elevated, and the front vise releases its grip on the work. Directly thereafter, the indexing vise which had been retracted during the sawing operation and which has gripped the work is advanced to project the work through the front vise and beyond the cutting plane. The distance the work projects beyond the cutting plane determines the length of the piece cut from the stock during the next cutting operation; and this, of course, depends upon the distance the indexing vise travels with the stock in its grasp.

Customarily, the indexing vise is reciprocated by a hydraulic ram so that the distance the vise is moved in either direction can be limited by appropriate stop means which simply interrupts or blocks further travel of the vise. Usually the stop means which defines the limit of forward or work feeding travel of the indexing vise is fixed. This presents no problem, since any rigid structure can be employed for the purpose, or if desired the piston of the ram can be allowed to bottom on the front end of its cylinder.

But one of the limits of the stroke of the indexing vise must be adjustable, otherwise the length of the pieces into which the stock is cut by the saw would always be equal to the stroke of the ram. With the limit of forward travel fixed—as it usually is—the means employed to define the limit of the retraction stroke of the indexing vise must be adjustable.

Heretofore, the only known way of adjustably limiting the retraction stroke of the indexing vise was by a slidably mounted mechanical stop that could be secured in differeint positions along the path of travel of the vise. Although a limit switch was tripped by the indexing vise just before it contacted the mechanical stop in order to signal the control circuit of the machine to continue with the rest of the cycle, such limit switch actuation could not be employed to stop the retraction of the vise. The point at which the limit switch was tripped by the moving vise was not sufficiently definite to assure the desired accuracy in the location of the vise after being stopped by any mechanism that might be controlled by a limit switch. Hence, the switch was slightly overridden and motion of the indexing vise was continued until it collided with the mechanical stop. Moreover, it was customary to maintain power on the hydraulic ram even after the stop was contacted and as long as the indexing vise remained in its retracted position.

Under the circumstances, the structure by which retraction of the indexing vise was stopped had to be strong enough to withstand the full force of the hydraulic ram in addition to the inertial load incident to the collision of the moving vise with the stop. While these requirements could be, and were, obtained by building brute strength into the stop structure, the need for adjustability introduced a serious problem. Here again, rugged strength had to be provided in order to secure the stop in a selected position. Fine adjustment of the position of the stop thus was out of the quesion; and if perchance during setting of the stop it was brought to exactly the right location, the tightening of the bolts by which it had to be held inevitably disrupted that setting.

Where accuracy on the order of plus or minus a few thousandths of an inch was required, the inability to effect fine adjustment of the stop location was extremely troublesome. Because of this lack, it was necessary to use a "set, cut and try" procedure in adjusting the location of the rear stop, a practice that was not only irksome and time consuming, but costly if the material being cut was one of the expensive exotic metals. Every piece of such material that had to be scrapped because its length was a few thousandths of an inch shorter than it should be could represent quite an item of expense which would be compounded if only a few pieces of each of several lengths were required.

With a view toward eliminating the foregoing objections and disadvantages of prior ways of setting the limits of indexing travel, this invention has as its purpose and object to provide an improved adjustable stop for limiting travel of the indexing vise, in one direction at least, which completely obviates the need for collision between the moving vise and a physical stop, and instead utilizes opposing fluid pressure forces to stop the movement of the vise at exactly the correct location.

Another object of this invention is to provide an adjustable stop for limiting the movement of the indexing vise of an automatic cutoff saw, or some comparable work feeding device, which can be quickly and easily adjusted with micrometer accuracy to stop travel of the moving structure when it reaches the desired location, and wherein the parts needed to maintain that adjustment are relatively light and capable of being locked in position with a finger-tight force.

Another object of this invention is to provide an adjustable stop for arresting travel of an indexing vise which incorporates means for decelerating the final motion of the vise towards its intended position of rest.

Still another object of this invention resides in the provision of stop means of the character described which, in addition to decelerating the travel of a power reciprocated structure, more specifically the indexing vise of an automatic cutoff saw, toward a defined position of rest just before it reaches that position, also incorporates means to effect gradual acceleration of the movement of said structure away from said position when power is applied to the structure to move it in the opposite direction.

A further object of this invention is the provision of an adjustable stop for arresting motion of the indexing vise of an automatic cutoff saw at either of its limits of travel—or at both limits—wherein the motion of the vise is stopped and the vise is held against drifting in either direction, by equal and opposite fluid pressure forces acting upon the opposite sides of a piston operating in a cylinder, the cylinder being stationary and the piston connected to the vise to move the same, or vice versa.

It is also an object of this invention to provide a stop mechanism of the character set forth in the immediately preceding paragraph, wherein a control valve connected between the cylinder ports and a source of fluid pressure has a movable flow controlling means which may be actuated either by an adjustable mechanical lost motion connection with the reciprocable indexing vise or by electrically powered motion producing means that is governed by a control circuit which includes instrumentalities for comparing an electrical output which is a function of the position of the vise with an electrical reference output.

In another embodiment of the invention, the stop mechanism referred to in the preceding paragraphs is employed to decelerate final advance of a long workpiece, such as a structural member, by hydraulically driven rollers, and to position said long workpiece at an accurately defined location with respect to the cutting plane of a cutoff saw. Here again, it is the purpose and object of this invention to eliminate the problems and difficulties inherent in the use of adjustable physical stops strong enough to arrest power produced advance of a relatively fast moving workpiece, often weighing several tons.

Thus, many of the objects specifically mentioned in connection with the control of the indexing vise, also apply to roller produced advance of long workpieces.

With these observations and objects in mind, the manner in which the invention achieves its purpose will be appreciated from the following description and the accompanying drawings. This disclosure is intended merely to exemplify the invention. The invention is not limited to the particular structure disclosed, and changes can be made therein which lie within the scope of the appended claims without departing from the invention.

The drawings illustrate several complete examples of the physical embodiment of the invention constructed according to the best modes so far devised for the practical application of the principles thereof, and in which:

FIG. 3 is a fragmentary detail view of a portion of the control valve which forms part of the improved stop mechanism;

FIG. 4 is a diagrammatic illustration of one way in which an electric control circuit can be employed to bring the movable flow controlling means of the control valve to its position causing equal and opposite fluid pressure forces to be exerted on a member movable with the indexing vise;

FIGS. 5, 6 and 7 are perspective views, more or less diagrammatically illustrating three different adaptations of this invention to cutoff saws of the type employed in cutting long lengths of stock such as structural steel, wherein the stock is moved by powered rollers upon which it rests.

Figure 1:
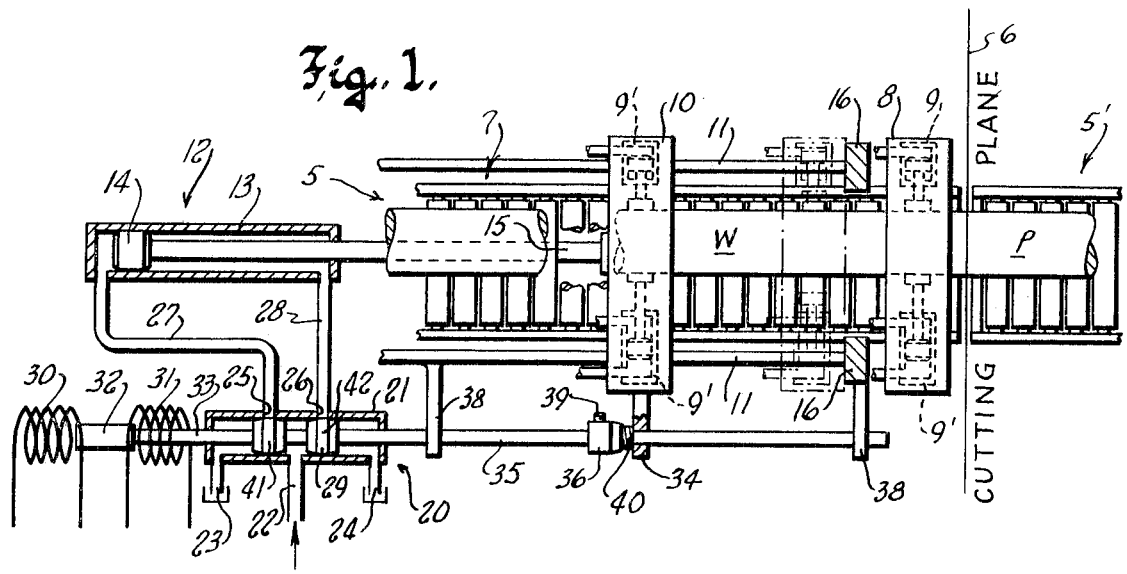
FIG. 1 is a more or less diagrammatic view illustrating one embodiment of that form of the invention which relates to the control of the indexing vise of an automatic cutoff saw, and showing only so much of the structure of the saw as is necessary for an understanding of the invention.
Figure 2:
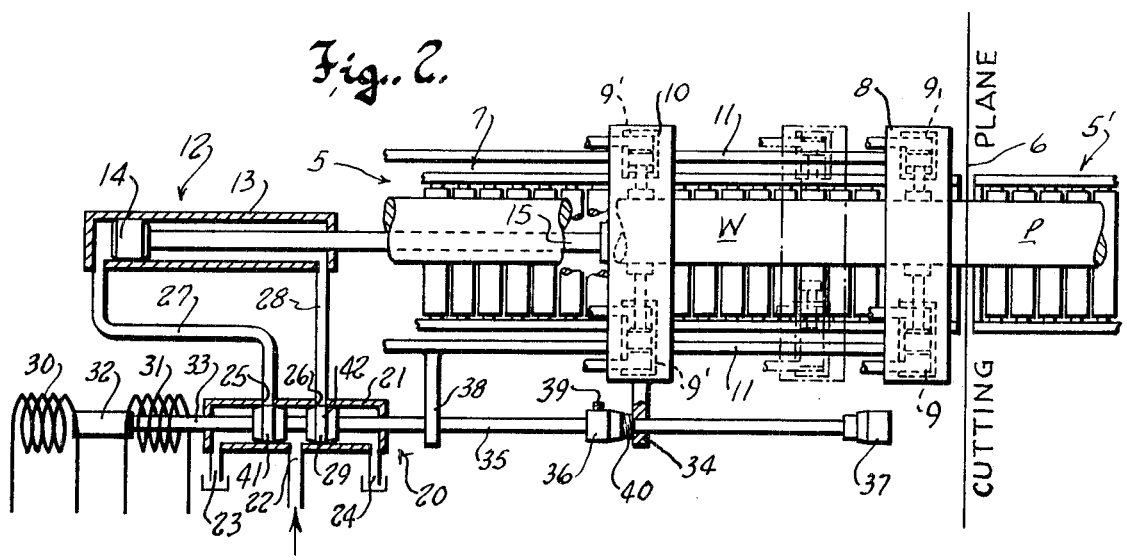
FIG. 2 is a view similar to FIG. 1 but differing therefrom in that in the latter only the retracted position of the indexing vise is defined by the stop means of this invention, whereas in FIG. 2 both the retracted and the forward or advanced positions of the vise are defined thereby.

Referring to the accompanying drawings, and especially to FIGS. 1-3, the numeral 5 designates the work supporting table of a cutoff saw upon which the work W—for instance a length of bar stock—rests while a piece P is being cut therefrom by the cutting tool of the machine. The cutting tool may be of any type, but in any event it operates in a fixed vertical plane. Thus it may be an endless saw blade trained over pulleys mounted on a frame or head that moves up and down with the cutting stretch of the blade, represented by the line 6 in FIGS. 1 and 2, confined to the vertical cutting plane, as in the Crane et al Pat. No. 2,898,669. The length of the piece cut from the work is, therefore, always equal to the distance the work protrudes beyond the cutting plane.

As indicated, the table 5 comprises a series of parallel rollers freely rotatably supported at their ends upon the stationary frame structure of the machine, indicated generally by the numeral 7. A similar table 5' is located at the front ofthe machine to receive the pieces P as they are cut from the stock.

During the cutting operation, the workpiece or stock is firmly gripped and held between the jaws of a work holding vise 8, often referred to as the front vise of the machine. This vise has a fixed location directly behind the cutting plane, so that it grips the workpiece closely adjacent to the point at which the saw makes its cut. The jaws of the vise are opened and closed by hydraulic cylinders 9.

A second vise 10 located behind the front vise is slidably supported on ways 11 which form part of the stationary frame structure of the machine. This second vise feeds or indexes the work to the work zone, and for this purpose it is reciprocated between retracted position and an advanced position by a reversible hydraulic motor 12, having a cylinder 13 and a piston 14. One of these elements, preferably the cylinder, is fixed to the stationary frame structure of the machine while the other is connected to the indexing vise 10 by a rod 15.

As in the case of the front vise, the jaws of the indexing vise are opened and closed by hydraulic cylinders 9'.

The machine is equipped with a control system (not illustrated) which opens and closes the vises, lowers and raises the saw head and reciprocates the indexing vise, all in proper sequence. Thus, during the sawing operation while the saw frame is descending, the front vise 8 is closed and firmly holds the work which was brought into position to be cut by a prior advance of the indexing vise 10. It is of course understood that the jaws of the indexing vise are closed onto the workpiece while the vise is in a retracted position, and that before the indexing vise begins its advance the saw head is elevated to lift the saw above the path of the stock and the front vise is opened to permit the front end portion of the workpiece to be projected through the front vise and beyond the cutting plane. The length of the piece that is then cut from the stock depends upon how far the stock protrudes beyond the cutting plane, and this in turn is determined by the distance the indexing vise travels with the workpiece in its grasp.

It should also be understood that retraction of the indexing vise occurs after the front vise has closed and gripped the workpiece. Hence, retraction of the indexing vise may take place while the saw is making its cut.

Ordinarily, the control system of the machine keeps repeating the cycle until the workpiece or stock has been completely cut into pieces, unless it is stopped manually or by some malfunctioning which trips a control swtich.

As indicated, the length of the pieces cut from the workpiece during the repeated cycles of the machine is determined by the length of the stroke of the indexing vise while the workpiece is in its grasp; and since the machine is expected to be able to cut the pieces to any length within the capacity of the machine—to illustrate, anything between twenty-four inches and a small fraction of an inch—it follows that the means employed to stop the travel of the indexing vise, at least in one direction, must be adjustable. In the other direction, traverse of the indexing vise can be stopped by any suitable fixed structure.

Conventionally, it is the advance or forward travel of the indexing vise that is arrested by a fixed stop, which may be simply a pair of abutments 16 (FIG. 1) solidly fixed to or forming a part of the stationary frame structure of the machine. These abutments, as shown in FIG. 1, are positioned to have the advancing vise 10 collide therewith, and since they are stationary and require no adjustment, they can be as solid and strong as needed to cope with the driving force of the motor 12 and the inertial force of a heavy moving mass. For illustration, in a typical cutoff saw, the total of these forces may be as much as 6000 pounds.

It is self evident that the means employed to arrest retraction of the indexing vise must be capable of handling this same force, but in this case the problem is not only one of providing sufficient strength but, more important, making the stop adjustable and reliably secure against loss of adjustment. In contrast to the "brute strength" approach heretofore employed in an effort to meet these requirements, this invention uses an entirely different way of stopping the retraction of the indexing vise at any selected location. It is done by so controlling the delivery of pressure fluid to the hydraulic motor 12, by which the vise is being retracted, that as the vise approaches the desired position the fluid pressure driving the motor is reduced and, at the same time, an opposing pressure is developed in the motor. When the vise reaches its desired position, the fluid pressure forces acting on opposite sides of the piston 14 balance one another and thereby hold the vise against movement in either direction.

To this end, a control valve 20 is connected between the motor 12 and the source of fluid pressure that drives the motor. This control valve has a cylinder 21 with an inlet port 22 connected with the fluid pressure source, a pair of exhaust ports 23 and 24 at its opposite ends, and a pair of motor ports 25 and 26 that are respectively connected through high pressure lines 27 and 28 with the head and rod ends of the cylinder 13 of the motor 12. A spool 29 slidably mounted in the cylinder 21 forms the movable flow controlling means for the valve.

When the spool 29 is shifted to the left from its position shown in FIGS. 1 and 2, the head end of the motor 12 is connected with the fluid pressure source and its rod end is connected through the exhaust port 24 with the tank of the hydraulic system. As a result, the motor 12 functions to drive the indexing vise to the right, i.e., it imparts work advancing movement to the vise; and when the spool of the control valve is shifted to the right from the position shown in FIGS. 1 and 2, the reverse condition obtains and the vise is retracted.

Any suitable means that can be activated by the control circuit of the machine may be employed to shift the spool to and hold it in either of these two operating positions—as, for instance, a pair of solenoids 30 and 31 arranged, when energized, to attract an armature 32 which is connected to the spool by a rod 33. It will be appreciated that the solenoids and the armature constitute a motion producing means by which the spool is impositively moved to either of its two operating positions, and that as long as an energized solenoid remains energized it will impositively hold the spool in its respective operating position.

The spool 29 is also positively shiftable from an operating position by the motion of the indexing vise, and when this occurs the force of the energized solenoid then holding the spool in an operating position is overridden. In FIG. 1, this positive shifting of the spool is possible only during retraction of the vise, but in FIG. 2 it occurs during advance as well as retraction. In each case, the motion of the indexing vise is transmitted to the spool through a mechanical lost motion connection which comprises an abutment 34 on the vise, a rod 35 fixed to the spool and projecting therefrom through one end of the cylinder 21 to extend alongside the work table 5 and be slidably received in a hole in the abutment 34, and one or tow stops 36–37 on the rod. Bearings 38 slidably support the rod.

In the embodiment of the invention illustrated in FIG. 1, wherein work feeding travel of the indexing vise is arrested and its advanced position is defined by the fixed stop 16, there is only the one stop 36 on the rod 35. This stop, which is located between the control valve and the abutment 34, may be slid along the rod and locked thereto at any point by any suitable means, as for instance a set screw 39. This positioning of the stop—which may be facilitated by a scale of linear measurement delineated on the rod—though fairly accurate, is supplemented by a vernier adjustment of the abutment engaging end portion 40 of the stop. For this purpose, the end portion 40 is joined to the body of the stop through a micrometer screw connection.

Assuming that the position of the stop 36 on the rod 35 has been properly set to effect stopping of the retraction stroke of the vise at the point needed to have the machine cut pieces of precisely the prescribed length, collision of the abutment 34 with the end 40 of the stop as the indexing vise approaches that point will shift the spool to the left towards its position best shown in FIG. 3. As this shift takes place, the lands 41 and 42 of the spool approach alignment with the motor ports 25 and 26. Obviously, of course, for the vise to have been moving towards its retracted position, the spool 29 must have been in its operating position directing pressure fluid into the rod end of the cylinder 13, that is, to the right of the intermediate position shown in FIG. 1. Since the spool is impositively held in that operating position by the energized solenoid 31, it follows that for the retracting vise to shift the spool to the left, the force it applies to the spool must override the opposing force being applied thereto by the solenoid 31.

As shown in FIG. 3, the approaches 41' and 42' to the lands 41 and 42 are tapered and the width of the lands is somewhat less than that of the mouths 25' and 26' of the motor ports. Hence, as the spool approaches a position at which its lands 41 and 42 align with the motor ports, delivery of pressure fluid to the rod end of the cylinder 12 is gradually reduced while, at the same time, pressure fluid is gradually allowed to enter the head end of the cylinder. Also, because the mouths of the motor ports are slightly wider than the lands 41 and 42, both ends of the cylinder will have restricted communication with the exhaust ports. The net result of the described positioning of the spool 29 is that despite the difference in effective area at opposite sides of the piston, the fluid pressure forces acting on the piston will equalize at opposite sides thereof when the spool 29 reaches a predetermined location with respect to the motor ports; and with this equalization of forces, the retraction of the indexing vise will be stopped.

To those skilled in the art it will be apparent that some overtravel and hunting will occur, especially when the vise has gained significant momentum due to fast traverse for an appreciable distance. However, any such hunting will obtain for only a very brief interval, hardly ever longer than one-quarter of a second. When overtravel occurs, the spool 29 will be shifted to the left beyond the position it should occupy to stop the motor, with the result that the fluid pressure force acting on the head side of the piston will be slightly greater than that acting on the rod side. Accordingly, the vise will be moved to the right, and since the solenoid 31 remains energized until it is time to effect work feeding advance of the vise by energization of the solenoid 30, the spool 29 will travel with the vise as it moves forward. And if it again overtravels, the reverse conditions will obtain and the cycle will repeat as often as necessary to bring the vise exactly to its desired position.

The advantages of limiting travel of the indexing vise in the manner described rather than by simply physically blocking its further movement, are significant, as can no doubt be appreciated. To identify but a few—utmost accuracy in the location of the retracted position of the vise is assured, since any possible tendency for the vise to shift from its predetermined position is at once met with corrective balancing of forces; only light forces are involved in shifting the spool of the control valve to its motor stopping position; adjustment of the stop can be easily and quickly effected, and once made remains set; and travel of the vise is decelerated as it approaches its retracted position and gradually accelerated as advance of the vise is begun.

Though it is entirely satisfactory to employ a fixed mechanical stop to limit advance of the indexing vise, as in FIG. 1, both limits can be defined by having the travelling vise shift the spool 29 of the control valve. For this purpose it is only necessary to provide the rod 34 with the second stop 37, as shown in FIG. 2; but the stop 37 need not be adjustable on the rod.

It is also possible to reverse the order from that shown in FIG. 1, so that the vise would always be brought to a fixed retracted position defined by a stationary stop, and the length of the index would be obtained by adjusting the location of the stop 37 on the rod 34.

If the use of a mechanical lost motion connection between the indexing vise and the spool of the control valve presents any difficulties in the design of the machine, the spool can be shifted to its motor stopping position by an electric control system, as diagrammatically illustrated in FIG. 4.

In this case the control valve 45 is of the electro-hydraulic type, wherein the movable control element, i.e., the spool or its equivalent, is moved by electrically powered motion producing means supplied with power from an amplifier 46. The amplifier is connected with a power supply 47 which also provides a voltage source for position sensing instrumentalities 48 that provide an output which is a function of the position of the indexing vise. This output is fed to summation instrumentalities 49 where it is compared with a reference signal which may be an adjustable input command.

When the output from the position sensing instrumentalities and the reference signal bear a predetermined relationship, a control signal flows from the summation instrumentalities to the amplifier to cause the latter to send an activating voltage to the electro-hydraulic valve.

Since the invention is not concerned with the details of the control circuit or with its components, the simplified block diagram of FIG. 4 is deemed sufficient to show how such a circuit can be employed to control the position of the spool 29 or its equivalent in a suitable electrohydraulic valve.

FIGS. 5, 6 and 7 illustrate the application of the invention to cutoff saws designed especially for cutting long lengths of stock such as structural steel. Heretofore, it has been very difficult in these machines to accurately index the stock. This will be appreciated from the fact that it is not uncommon to advance the stock as much as forty feet at a relatively rapid rate, and if the stock has a heavy cross section the piece may weigh well over a ton. Nevertheless, with this invention such long heavy workpieces can be quickly and accurately brought into position to be cut.

As shown in FIG. 5, the stock or workpiece rests upon a series of parallel rollers 50 of equal diameter. All of these rollers, or a sufficient number of them, are drivingly connected with a hydraulic motor 51, by chain and sprocket connections 52 between adjacent rollers and a similar driving connection 53 between the motor and one of the rollers. Of course, any other suitable driving connection may be substituted for the chain and sprocket connections shown.

With the motor 51 in operation, the powered rollers advance the stock S through a holding vise 55 and beyond the cutting plane of the saw, which plane vertically bisects a slot 56 in a table 57. The advance of the stock continues until its leading end collides with a stop 58 operatively connected with the flow controlling spool 29' of a control valve unit 59 which, for all practical purposes, may be a duplicate of the control valve 20. Hence, the inlet port 22' of the control valve unit 59 is connected with a source of fluid pressure, its motor ports 25' and 26' are connected with the motor, and its exhaust ports 23' and 24' are connected with the tank of the hydraulic system. The direction selecting solenoids 30' and 31' are, of course, part of the unit 59.

The collision of the stock or workpiece with the stop takes place when the rollers have made the necessary number of revolutions to move the stock the selected distance, or in other words, when the work moving means has travelled the selected distance. Continued advance of the workpiece by the driven rollers after the workpiece contacts the stop 58, shifts the spool 29' of the control valve towards its motor-stopping position and, with this shifting of the spool, the motor is decelerated, as has been explained in connection with the description of the embodiment of the invention shown in FIGS. 1 and 2. Overtravel, of course, is inevitable but, as it occurs, the motor is reversed and the rollers retract the workpiece which again overtravels a slight amount. This back and forth movement or hunting continues for a very brief interval, and within less than one second the workpiece is "zeroed in" to its proper position, whereupon the saw operating in the cutting plane cuts through the workpiece.

In the machine of FIG. 5, the control valve unit 59 is mounted at a fixed location on the machine and an actuating rod 60 connected to the spool of the valve extends lengthwise of the machine alongside the row of rollers 50 to pass slidably through a carriage 61. The stop 58 is hingedly connected to the carriage to be swung between a lowered operative position in the path of the advancing stock, and a raised inoperative position enabling the stop to be moved to its selected position, for which purpose the carriage 61 is slidably supported on a track 62 that extends lengthwise of the machine. When the carriage has been adjusted to its proper location, a thumb screw 63 is tightened to secure the carriage to the actuating rod. Hence, the carriage and the stop together are the functional counterpart of the stop 36 in FIGS. 1 and 2, the only difference being that it is the stock itself which collides with the stop to shift the spool of the control valve.

The length of the piece cut from the stock, of course, depends upon the distance between the cutting plane and the location of the carriage when it is locked to the actuating rod. Any suitable measuring means may be provided to facilitate adjustment of the stop location—as, for instance, a scale of linear measurement delineated on the actuating rod.

It should be noted, though, that the adjusted or "set" location of the stop is not the same as its final or control position which differs from the "set" position by the distance the spool moves from its stock advancing position to its motor stopping position. Since the distance between these two positions is fixed, the difference is readily taken into account in the setting of the stop.

In FIG. 6, the control valve unit 64 and the carriage 61 constitute a unitary assembly since the valve spool actuating rod 65 is fixedly connected to the carriage. Both units of the assembly are slidably mounted on the track 62, and when the assembly has been moved to its desired location and the valve unit 64 is locked to the track by a thumb screw 66, motion of the carriage in consequence of collision of the workpiece with the stop will be transmitted directly to the valve spool.

In the embodiment of the invention illustrated in FIG. 7, the carriage 61 is moved along the track 62 to adjust the position of the stop 58 by a chain 67 driven by an electric motor 68, the chain being trained over a drive sprocket 69 on the shaft of the motor and an idler sprocket 71. The sprocket chain also serves as part of a motion imparting connection between the carriage and the spool of the control valve 72 which is mounted in a fixed location. The remainder of the motion imparting connection comprises a rack 73 fixed to the spool of the control valve, a pinion 74 meshing with the rack and a disengageable clutch 75 through which the pinion is drivingly connected with the shaft on which the sprocket 69 is fixed.

As will be readily apparent, the clutch must be disengaged during adjustment of the carriage location by the motor 68. Upon reengagement of the clutch, motion imparted to the stop by the advancing workpiece will rotate the pinion and shift the spool of the control valve to regulate the motor 51.

As noted hereinbefore, the cutoff saw of FIGS. 5, 6 and 7 is designed especially for cutting long lengths of stock. Accordingly, it makes no difference whether the work holding vise 55 is at one side or the other of the cutting plane. But in the cutoff saw of FIGS. 1 and 2, it is important that the work holding or front vise 8 and the indexing vise 10 be at the same side of the cutting plane— the upstream side with respect to the direction of work feed—since cutoff saws of this type must be capable of cutting a thin slice off the end of the workpiece, and obviously it would not be possible to securely hold the work with a vise that gripped only the slice being cut from the stock.

Another difference between the cutoff saw of FIGS. 1 and 2 and that of FIGS. 5, 6 and 7, is that with the former the indexing vise must be retracted before the next index can be effected. To minimize the time between successive cuts, the indexing vise may be retracted while the sawing operation is in progress; in which event the work can be indexed for the next cut as soon as the cut is completed and the saw is lifted. With the machine of FIGS. 5, 6 and 7, there is of course no need for retraction of the work feeding means—namely, the power driven rollers upon which the work rests. As soon as the cut is completed and the saw lifted, the rollers can be actuated to advance the stock. However, the nature of the work done on these machines seldom involves the need for quickly repeated cutting operations.

From the foregoing description, taken with the accompanying drawings, it will be apparent that this invention eliminates a problem that for years has bothered designers and manufactures of automatic cutoff saws, and thus constitutes a significant improvement in the art.

What is claimed as our invention is:

1. In a cutoff saw having a cutting tool operating in a fixed plane:
    (a) work moving means for advancing work with substantially one continuous motion into position to have a piece of predetermined length cut therefrom;
    (b) reversible fluid motor means for driving said work moving means either forwardly or rearwardly;
    (c) a directional control valve for controlling flow of pressure fluid to and from the motor means, said valve having
        (1) an inlet port connectible with a fluid pressure source,
        (2) forward and reverse motor ports connected with the motor means,
        (3) exhaust port means, and
        (4) a flow controlling movable valve element controlling communication between said ports;
    (d) first motion producing means operatively connected with the movable valve element to impositively move the same to and impositively hold it in either of two operating positions in which it effects advance or retraction of the work moving means, depending upon the direction said movable valve element was moved; and
    (e) second motion producing means automatically operative as a consequence of motor driven travel of the work moving means in one direction for a selected distance to positively move said movable valve element from one of said two operating positions towards an intermediate position at which it effects imposition of equal but opposite fluid pressure forces on the work performing element of the motor means to thereby decelerate travel of the work moving means,
        and to coact with said first motion producing means and with said flow controlling valve element to bring the valve element exactly to said intermediate position and thereby stop the motor means.

2. In a cutoff saw, the structure recited in claim 1, wherein said work moving means is an indexing vise mounted at one side of the cutting plane for reciprocation between a retracted work gripping position and an advanced work delivering position,
    wherein said reversible fluid motor means is a reciprocating motor having its work performing element drivingly connected with the indexing vise, and
    further characterized by a work-holding cise adjacent to the cutting plane at the same side thereof at which the indexing vise is located, to grip and hold the work advanced and delivered by the indexing vise,
        so that the indexinp vise may be retracted during the cutting operation.

3. In a cutoff saw, the structure of claim 2, further characterized in that the second motion producing means comprises an abutment connected with the indexing vise to travel therewith, a stop member in the path of said abutment to be moved thereby as the abutment collides with the stop member, and means forming a motion transmitting connection between the stop member and the movable valve element of the directional control valve through which said movement of the stop member moves the movable flow controlling member towards its intermediate position,
    said motion transmitting connection disposing the stop member and said movable flow controlling member in a fixed predetermined relationship.

4. In a cutoff saw, the structure of claim 3, wherein said stop is located rearwardly of the abutment which travels with the indexing vise,
    so that collision of the abutment with the stop occurs only during retraction of the indexing vise.

5. In a cutoff saw, the structure of claim 4, further characterized by a second stop connected with the movable valve element and located forwardly of the abutment,
    so that said second stop is engaged by the abutment during advance of the indexing vise.

6. In a cutoff saw, the structure recited in claim 1, wherein said work moving means comprises a series of rollers upon which the work rests,
    and wherein said motor means imparts rotation to a sufficient number of the rollers to move the work resting on the rollers,
        so that the travel of the work moving means referred to in paragraph e of claim 1 is the distance a point on the surface of any driven roller moves in bringing the work into position to be cut.

7. In a cutoff saw, the structure of claim 6, further characterized in that the second motion producing means comprises a stop connected with the movable valve element of the control valve and positioned in the path of work being brought into position to be cut,
    so that it is the motion of the work itself that shifts the movable valve element.

8. In a cutoff saw, the structure of claim 7, further characterized in that said stop is adjustable lengthwise of the path of the work to thereby enable selection of the distance the work moving rollers move the work in bringing the same into position to be cut.

9. In a cutoff saw, the structure of claim 8, wherein the control valve occupies a fixed position along the path of the work, and wherein the connection between the stop and the movable valve element is adjustable to accommodate said adjustability of the stop.

10. In a cutoff saw, the structure of claim 8 wherein the entire control valve is adjustable lengthwise of the path of the work, along with said stop.

11. In a cutoff saw having a cutting tool operating in a fixed plane, and work supporting means to support the work as a piece is cut therefrom and while it is being advanced to the cutting tool, the improvement which comprises the combination of:

(a) a work holding vise to grip and hold the work while a piece is being cut therefrom,
said work holding vise being located a fixed distance to one side of the cutting plane;
(b) a work indexing vise at the same side of the cutting plane mounted for reciprocation towards and from the work holding vise, between an advanced work delivering position and a retracted position the distance between said positions determining the length of the piece cut off the work,
said indexing vise being adapted, when in its retracted position, to grip the work, and when in its advanced position to release the work,
so that by reciprocation of the indexing vise the work can be intermittently advanced in substantially one continuous motion through the work holding vise and beyond the cutting plane;
(c) a reversible fluid pressure motor connectible with a fluid pressure source and having its work performing element drivingly connected with the indexing vice to advance or retract the same depending upon the direction of motor operation;
(d) means for controlling the direction of motor operation;
(e) first stop means to stop travel of the indexing vise in one direction and to define the limit of its travel in that direction; and
(f) second stop means to stop travel of the indexing vise in the opposite direction precisely when the indexing vise has reached a predetermined location in its path of travel, which location is spaced from the limit of travel defined by the first stop means a distance determined by the desired length of the piece to be cut off the work,
said second stop means comprising motor-controlling instrumentalities connected between the motor and the fluid pressure source including movable flow controlling means,
said second stop means being further characterized by abutment means in predetermined fixed spacial relationship with respect to the movable flow controlling means, and
means automatically operative in consequence of travel of the indexing vise as it approaches said predetermined location to effect motion of said abutment means to bring said movable flow controlling means to a position at which it effects imposition of equal but opposite fluid pressure forces on the work performing element of the motor whereby the motor is stopped.

12. In a cutoff saw, the combination set forth in claim 11, further characterized by
means for effecting controlled deceleration of the travel of the indexing vise as it approaches said predetermined location.

13. In a cutoff saw, the combination set forth in claim 11, further characterized by
means for effecting controlled deceleration of the travel of the indexing vise as the fluid pressure motor begins to move the vise from said predetermined location.

14. In a cutoff saw, the combination of claim 11, wherein it is the retracted position of the indexing vise that is defined by the second stop means.

15. In a cutoff saw, the combination of claim 11 wherein the first stop means comprises a combination of elements similar to those which comprise the second stop means.

16. In a cutoff saw, the combination of claim 11 wherein the fluid motor is a double acting cylinder having its work performing element extending from one end thereof, and wherein the motor controlling instrumentalities of the second stop means and the movable flow controlling means thereof comprises
a valve having a pair of motor ports connected with the opposite ends of the cylinder, exhaust port means,
an inlet port connectible with the fluid pressure source, and
a movable valve element controlling communication between said ports and which, when the indexing vise reaches said predetermined location establishes limited communication of both motor ports with the inlet port and the outlet port means so as to effect subjection of the work performing element of the motor to said equal but opposite fluid pressure forces,
and a rod connected with the movable valve element to positively impart motion to the movable valve element in the direction to stop the motor, said rod being disposed in parallel relationship to the path of movement of the indexing vise, a stop slidably mounted on the rod and securable thereto at any point along the length thereof, whereby upon such securement the stop is in a fixed spacial relationship with the movable valve element, and an abutment movable with the indexing vise to collide with said stop and thereby move the rod in the direction to stop the motor,
said fixed spacial relationship assuring that the vise will be in the same position every time the motor is stopped by such collision.

17. The cutoff saw of claim 11, wherein said second stop means comprises motor controlling instrumentalities connected between the motor and the fluid pressure source including
movable flow controlling means,
electrically powered motion producing means operatively connected with said flow controlling means,
instrumentalities for sensing the position of the indexing vise and for producing an electrical output wich is a function of the position of said vise,
instrumentalities for comparing said electrical output with a reference signal, and operatively connected with a source of electric power and said electrically powered motion producing means to cause the latter to bring the flow controlling means to a position at which it effects imposition of equal but opposite fluid pressure forces on the work performing element of the motor when said electrical output and the reference signal bear that relationship which obtains only when the indixing vise is at said predetermined position, whereby the motor is stopped.

References Cited

UNITED STATES PATENTS 3,182,538   5/1965   Whitmore et al. ___ 226—162 X

ALLEN N. KNOWLES, Primary Examiner

U.S. Cl. X.R.

226—126, 143, 146, 152, 162